Feb. 24, 1970 A. B. E. ELLIS 3,497,617
ELECTRICAL POSITION RESOLVER ARRANGEMENTS
Filed Aug. 21, 1967

INVENTOR
*Alfred Brian Edwin Ellis*
BY
*Baldwin Wight Diller & Brown*
ATTORNEYS

United States Patent Office 3,497,617
Patented Feb. 24, 1970

3,497,617
ELECTRICAL POSITION RESOLVER
ARRANGEMENTS
Alfred Brian Edwin Ellis, Chelmsford, England, assignor to The Marconi Company Limited, London, England, a British company
Filed Aug. 21, 1967, Ser. No. 662,033
Claims priority, application Great Britain, Sept. 7, 1966, 40,055/66
Int. Cl. G08c 21/00, 25/00
U.S. Cl. 178—19                5 Claims

ABSTRACT OF THE DISCLOSURE

A position resolver having a resistive layer to which two pairs of conductive strips are connected is described. Two input signals of different frequencies are applied respectively to each pair of strips. A probe, movable across the layer, picks up signals compounded of frequencies in proportions dependent on the position of the probe on the surface. Signals of the first and second frequencies are separated at the output of the probe. A portion of the separated signal of the first frequency is applied as feedback to the pair of strips to which a signal of that frequency is not normally applied and, similarly, a portion of the separated signal of the second frequency is applied as feedback to the pair of strips to which a signal of that frequency is not normally applied to correct errors caused by field distortion. The inputs may be applied in push pull balanced feed.

---

This invention relates to arrangements including what are herein termed electrical position resolvers, that is to say devices wherein the position of a member relative to a surface across which said member is movable is resolved and translated into two electrical signals representative respectively of the two co-ordinates of position of said member. More specifically the invention relates to arrangements including electrical position resolvers of the kind wherein the surface is provided with a resistive layer to which connection is made by means of two pairs of parallel strips, those of one pair being perpendicular to those of the other, and different input frequencies are applied between the strips of each pair, the movable member being a pick-up probe which is movable over said surface and is adapted to pick up signals compounded of different input frequencies in proportions dependent on the position of said probe on the surface.

Figure 1:
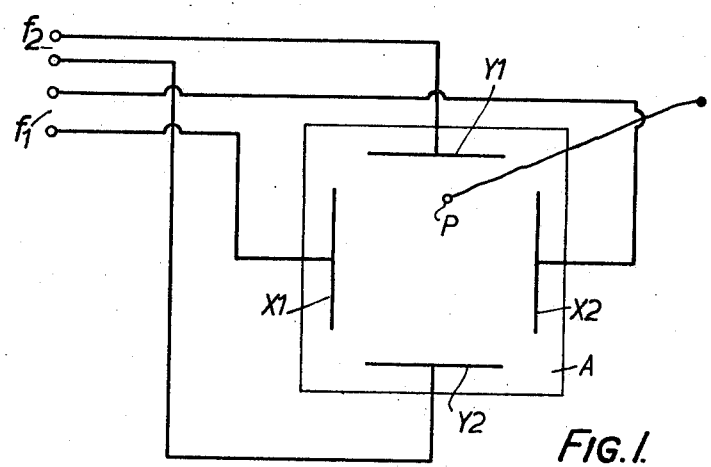
Figure 2:
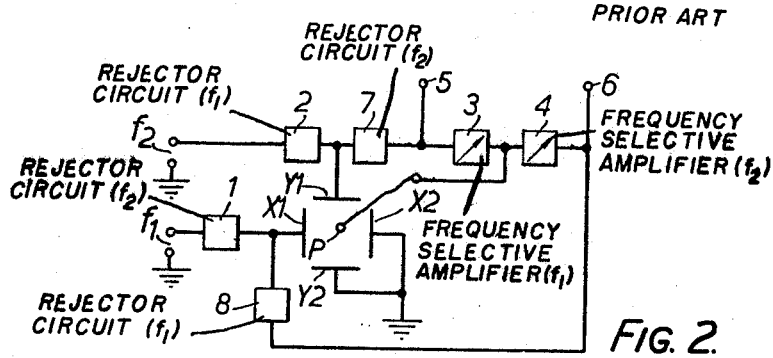
Figure 3:
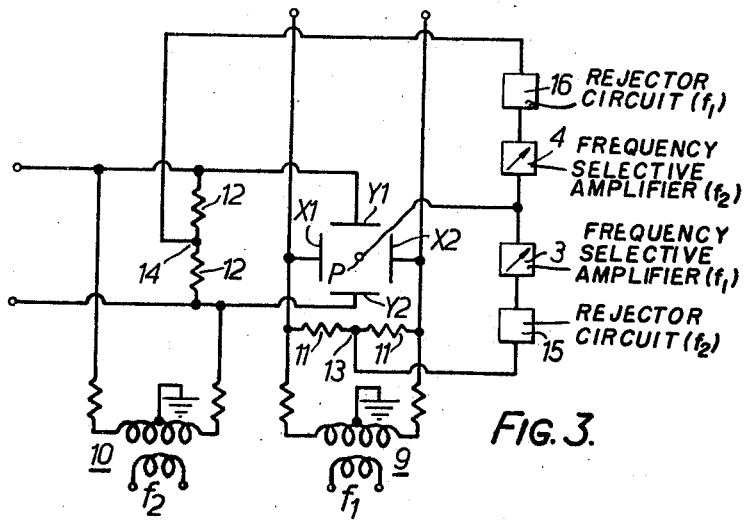

The invention is illustrated in and explained in connection with the accompanying drawings in which FIGURE 1 shows diagrammatically a typical known electrical position resolver of the kind referred to and FIGURES 2 and 3 show diagrammatically two embodiments of this invention.

Referring to FIGURE 1 the known electrical position resolver therein illustrated consists of a base plate A, e.g. a glass plate which might, in typical practice, be a square plate with a side of, say, 10", on which is deposited a thin layer (not separately shown) of suitable resistive material. Connection to the resistive material is made by means of two pairs X1, X2 and Y1, Y2 of connecting strips lying along the sides of a square, the strips of each pair being parallel. Two different readily separable input frequencies $f_1$ and $f_2$ are applied to the two pairs of strips. They may be applied, as shown, in push-pull between the strips of the respective pairs—this balanced input feed is the one usually preferred—or, of course, a "single sided" feed may be used one strip in each pair being earthed and the two frequencies being applied to the other two strips, one in each pair with respect to earth. The resistive layer deposit is covered with a hard insulating layer to protect it and a probe P is movable over the insulating layer, making capacitative coupling with the resistive layer through the insulating layer at whatever position the probe may occupy. The amplitude of the signal of frequency $f_1$ picked up by the probe P will depend upon its position between the two strips X1 and X2 and similarly the amplitude of the signal of frequency $f_2$ picked up by the probe will depend on its position between the two strips Y1 and Y2. If, therefore, the output from the probe is filtered to separate the two frequency components and the separated components amplified and rectified, the resultant D.C. signals will be representative of the co-ordinates of the position of the probe. Where the input frequencies are applied in push-pull between the strips of the respective pairs i.e. balanced input feeds are employed, the detector should be of any well known type adapted to provide rectified output signals of one polarity from a frequency which is in phase coincidence with a reference frequency, and rectifier output signals of the opposite polarity from a frequency in phase opposition to a reference frequency. The reference frequency can most conveniently be derived from the input frequency. In any case the resultant rectified signals can be utilised in any desired way, e.g. fed into a computer or presented to a display device such as a cathode ray tube, or employed to perform a desired control function.

Ideally the fields produced by the input frequencies $f_1$ and $f_2$ should be uniform and everywhere mutually perpendicular. In practice, however, this ideal is not realised and quite substantial distortion of the fields occurs, particularly at the corners of the area on the sides of which the strips lie and at and near the edges of that area, in which region the field lines tend to become materially curved instead of remaining straight. Such field distortion obviously produces lack of fidelity of the signal components picked up by the probe. Errors of this nature can, as is known, be corrected by subjecting the separated probe output signal components to non-linear amplification to introduce compensation for the errors which would otherwise occur, but such non-linear amplication does not provide a practically satisfactory solution of the problem in part because the amplifiers required are expensive and difficult to design and in part because the requirement that there shall be stability of the chosen non-linear law of amplification is difficult to satisfy. The present invention seeks to solve the problem without having recourse to non-linear amplification.

According to this invention an arrangement including an electrical position resolver of the kind referred to comprises means for applying component frequency signals derived from the output pick-up probe of said resolver as auxiliary correcting input potentials to said resolver substantially to compensate for and correct errors which would otherwise be caused by distortion of the fields produced by the normal different frequency inputs.

In one way of carrying out the invention there is superimposed upon each of the two normal inputs of different frequencies an auxiliary correcting input potential which is of the other frequency and is derived from the probe output. In one embodiment of this nature each of the two normal inputs of different frequencies is applied to one or other of two mutually perpendicular strips of the resolver through a rejector circuit tuned to reject the other frequency, there being also applied to each of said strips an auxiliary correcting input potential which is of a frequency different from that of the normal input to said strip and is applied thereto through a rejector circuit tuned to reject the frequency of said normal input.

In another way of carrying out the invention each of the two normal inputs of different frequencies is applied in push-pull between the strips of one or other of the two pairs of strips by means of a circuit which includes a neutral point and an auxiliary correcting input potential of the same frequency as that of the normal input applied between any pair of strips is derived from the probe output and applied at the neutral point of the circuit associated with said pair. In one embodiment of this nature each normal input is applied between a pair of strips by a push-pull input circuit which includes, connected between the strips of the pair, two equal series resistances the junction point of which provides the neutral point.

In the embodiment shown in FIGURE 2 the normal input of frequency $f_1$ is applied to the strip X1 through a parallel tuned rejector circuit 1 tuned to reject the frequency $f_2$ and the normal input of frequency $f_2$ is applied to the strip Y1 through a similar rejector circuit 2 tuned to reject $f_1$. The strips X2 and Y2 are earthed the normal inputs being thus "one sided" or unbalanced. Output from the probe P is amplified by two amplifiers 3 and 4 of which the former selectively amplifies component signals of frequency $f_1$ and the latter selectively amplifies component signals of frequency $f_2$. Output signals of the two different frequencies are taken off for utilisation at terminals 5 and 6. Auxiliary correcting input signals of frequency $f_1$ are applied from the output of amplifier 3 through a rejector circuit 7 tuned to reject $f_2$ to the strip Y1 and, similarly, auxiliary correcting input signals of frequency $f_2$ from the output of amplifier 4 are superimposed upon strip X1 through a rejector circuit 8 tuned to reject $f_1$. In order to facilitate adjustment to attain optimum correction of field distortion the amplifiers 3 and 4 are preferably of adjustable gain.

Although FIGURE 2 shows an unbalanced or "single sided" arrangement obviously the two normal inputs could be applied to the strips of the two pairs in push-pull and the auxiliary correcting inputs applies to the strips of the appropriate pairs in phase.

In the embodiment shown in FIGURE 3 the two normal inputs $f_1$ and $f_2$ are applied between the strips of the pairs X1 and X2 in push-pull by means of input transformers 9 and 10 having secondaries with earthed centre taps. Across each secondary is a circuit which comprises equal series resistances 11 or 12 and provides a neutral point 13 or 14 between them. Output from the probe P at the component frequency $f_1$ is selectively amplified by the amplifier 3, preferably of adjustable gain, and superimposed at the neutral point 13. Similarly probe output at the component frequency $f_2$ is selectively amplified by amplifier 4, also preferably of adjustable gain, and superimposed at the neutral point 14. 15 and 16 are rejector circuits, which may be provided if desired, and are respectively tuned to reject the frequencies $f_2$ and $f_1$.

In the embodiment of FIGURE 3 the total voltage across any pair of strips is constant but their voltages are varied with respect to earth by the negative feed back voltage (the auxiliary correcting input) applied at the appropriate neutral point. Thus the voltage of frequency $f_1$ between the strips X1, X2 is constant but their voltages at this frequency with respect to earth are varied by the auxiliary correcting input applied at 13, the other strips Y1 and Y2 being at earth potential so far as the frequency $f_1$ is concerned. The feedback is adjusted to such value that a null or zero point occurs (as respects $f_1$) at the position of the probe. In similar manner the feedback to point 14 produces a null or zero point as respects frequency $f_2$ at the position of the probe.

I claim:
1. An arrangement including an electrical position resolver having a surface provided with a resistive layer to which connection is made by means of two pairs of parallel strips, the strips of one pair being perpendicular to the strips of the other pair, means for applying a first input frequency between the strips of one pair of said strips, means for applying a second input frequency between the strips of the other pair of said strips, a pick-up probe, movable over said surface to pick up signals compounded of said first and second frequencies in proportions dependent upon the position of said probe on the surface, said probe being connected to means for separating out said first and said second frequencies from the output of said probe, said arrangement also including means for applying a portion of a signal at said first frequency from said frequency separating means to said other pair of strips as a first correcting signal and means for applying a portion of a signal at said second frequency from said frequency separating means to said one pair of strips as a second correcting signal to compensate for errors in the position information presented by the signals picked up by said probe which would otherwise be caused by distortion of the fields produced by the input signals of said first and second frequencies applied to said two pairs of strips.

2. An arrangement as claimed in claim 1 wherein each of the inputs of different frequencies is applied to a respective one of said pairs of perpendicular strips of the resolver through a separate rejector circuit tuned to reject the other frequency.

3. An arrangement as claimed in claim 2 wherein each of said first and second correcting signals is applied to a respective one of said pairs of perpendicular strips of the resolver through a further separate rejector circuit tuned to reject the signal frequency applied to the corresponding one of said pairs of perpendicular strips.

4. An arrangement as claimed in claim 1 wherein each of the first and second inputs is applied in push-pull between the strips of a respective one of the two pairs of strips by means of a circuit which includes a neutral point and an input connection for a respective one of said first and second correcting signals coupled to said neutral point.

5. An arrangement as claimed in claim 4 wherein each of said first and second inputs is applied between a pair of strips by a push-pull input circuit which includes, connected between the strips of the pair, two equal series resistances the junction point of which provides the neutral point.

References Cited
UNITED STATES PATENTS

| | | | |
|---|---|---|---|
| 3,005,050 | 10/1961 | Koenig | 178—20 |
| 3,037,123 | 5/1962 | Lewis et al. | 235—198 |
| 3,066,251 | 11/1962 | Losher | 235—197 |
| 3,302,194 | 1/1967 | Green et al. | 178—18 X |

JOHN W. CALDWELL, Primary Examiner
M. M. CURTIS, Examiner

U.S. Cl. X.R.
178—18, 69